United States Patent [19]

Yamamoto et al.

[11] Patent Number: 4,516,142
[45] Date of Patent: May 7, 1985

[54] IMAGE SCANNING APPARATUS

[75] Inventors: Takaaki Yamamoto; Yasuhiro Kawai, both of Kanagawa, Japan

[73] Assignee: Fuji Photo Film Co., Ltd., Japan

[21] Appl. No.: 539,243

[22] Filed: Oct. 5, 1983

[30] Foreign Application Priority Data

Oct. 6, 1982 [JP] Japan ................. 57-175939

[51] Int. Cl.³ .............. G01D 15/00; G01D 15/14
[52] U.S. Cl. .................... 346/160; 346/108; 355/14 SH
[58] Field of Search .......... 346/108, 153.1, 160; 355/3 SH, 14 SH, 8; 358/300

[56] References Cited

U.S. PATENT DOCUMENTS 4,067,021 1/1978 Baylis et al. ............ 346/76 L
4,419,007 12/1983 Kingsley ............... 355/14 SH Primary Examiner—Thomas H. Tarcza Attorney, Agent, or Firm—Sughrue, Mion, Zinn, Macpeak & Seas

[57] ABSTRACT

An image scanning apparatus includes a main scanning drum and a pair of nip rolls moveable into and out of engagement with the drum for feeding a sheet during a scanning operation. When the nip rollers are spaced from the scanning drum, the sheet may be supplied downwardly by gravity between the drum and nip rolls. A moveable stopper is disposed in the path of the sheet to support the sheet with at least one end thereof disposed intermediate the scanning drum and nip rolls. Upon movement of the nip rolls into engagement with the scanning drum, the sheet will be fed upwardly past a scanning station for discharge through a first pair of discharge rolls. A second pair of discharge rolls is optionally provided below the stopper to facilitate the discharge of a sheet in the downward direction by means of a second pair of discharge rolls.

4 Claims, 4 Drawing Figures

IMAGE SCANNING APPARATUS

BACKGROUND OF THE INVENTION

The present invention relates to an image scanning apparatus in which a sheet to be scanned is two dimensionally scanned with a light beam, and more particularly to an image scanning apparatus in which the main scanning is carried out with a deflector and the auxiliary scanning is effected by mechanically moving the sheet.

An image scanning method has been extensively employed in the facsimile field wherein a light beam is one dimensionally deflected by a deflector to form a scanning line on a sheet to be scanned (the main scanning) and the sheet is mechanically moved in a direction perpendicular to the scanning direction thereby to form a number of scanning lines in parallel with the scanning direction (the auxiliary scanning) to perform an image recording or reading operation. For an apparatus in which the image scanning operation is carried out as described above, it is essential that the main scanning is carried out regularly with a constant period and the sheet to be scanned is moved in the auxiliary scanning direction at a constant speed. If the speed of movement of the sheet in the auxiliary scanning direction changes, naturally the scanning lines become irregular in density, which appears as a change in image density; that is, the resultant image is considerably lower in quality. This is a serious problem in processing a continuous gradation picture. The deterioration of image quality is described in "Problems in the Auxiliary Scanning of Cylinder Type Facsimile", National Technical Report, vol. 22, No. 55, October 1976, pp. 550-558; and in "Visibility and Correction and Periodic Interference Structures in Line-by-Line Recorded Image", Journal of Applied Photographic Engineering, vol. 2, No. 2, April 1976, pp. 86-92, in detail. It has been found through experiments made by the present inventors that in recording or reading an image having a resolution ranging about 10 to 20 lines/mm, the variation not less than 0.1% in the movement speed of the sheet results in visually detectable variation in the density of the image obtained.

In a conventional auxiliary scanning mechanism for moving a sheet to be scanned at a constant speed with high accuracy, a sheet-to-be-scanned loading table is fixedly secured to a nut screwed on a threaded bar and the table is moved in the axial detection of the threaded bar at a constant speed by rotating the threaded bar at a constant speed. The auxiliary scanning mechanism using the threaded bar which is turned at the constant speed is considerably disadvantageous in that the operating speed cannot be increased very much, because it is necessary to return the table to the original position when a sheet has been scanned and the image scanning operation is suspended in order to return the table to the original position. Furthermore, in the auxiliary scanning mechanism, not only the threaded bar, nut and guide rail must be high in mechanical accuracy, but also a number of mechanisms such as a mechanism for placing a sheet to be scanned on the table, a mechanism for discharging the sheet from the table and a mechanism for positioning the sheet in place on the table are intricate. Thus, the auxiliary mechanism is high in manufacturing cost. In addition, because of the intricate mechanisms in combination, the sheet to be scanned is often loaded erroneously or jammed.

In view of the foregoing, the present inventors have developed image scanning apparatus in which the time required for replacing a sheet to be scanned is minimized, a sheet to be scanned will never be jammed, and the auxiliary scanning can be carried out at low cost with a high degree of accuracy. Such apparatus are the subject of U.S. patent application Ser. Nos. 395,320 filed on July 6, 1982 and 491,003 filed on May 3, 1983.

The apparatus as shown in FIG. 1 comprises an auxiliary scanning rotary drum 11 (hereinafter referred to merely as "a drum", when applicable), a light source 30 adapted to emit a main scanning light beam which scans a sheet to be scanned in the axial direction of the drum 11 which is conveyed by the drum, nip rolls 12 and 13 provided near the scanning position of the main scanning light beam, the nip rolls 12 and 13 being moved into and out of engagement with the drum; a pair of sheet supplying rolls 8 for delivering a sheet 1 to be scanned to the nipping region between the drum 11 and the nip rolls 12 and 13, a stopper 16 provided downstream of the drum 11 and the nip rolls 12 and 13 in such a manner that it goes in and out of the passage-way of sheets 1 which are supplied by the sheet supplying rolls 8, a pair of sheet discharging rolls 21 for discharging the sheet 1 which has been scanned, and control means (not shown) for controlling an operation of moving the nip rolls 12 and 13 into and out of engagement with the drum 11, and an operation of the sheet passageway, which are carried out in association with each other, and the rotation of the drum 11.

In the apparatus disclosed by the specification of U.S. patent application Ser. No. 395,320, the drum 11 is rotated counterclockwise in FIG. 1, and a sheet 1 to be scanned is supplied by the pair of sheet supplying rolls 8 when the nip rolls 12 and 13 are disengaged from the drum 11 and the stopper 16 enters the sheet passageway. When the sheet is set in place on the drum 11 with its front end supported by the stopper 16, the nip rolls 12 and 13 are engaged with the drum 11 to start the running of the sheet 1. In this operation the stopper leaves the passageway thus allowing the sheet 1 to freely run.

The above-described image scanning apparatus is advantageous in that recording or reading can be achieved with high density uniformity. However, it is disadvantageous in that, in the case where a sheet to be scanned is one liable liable to be damaged, it may be damaged or scratched when pushed against the rotating drum 11 by the nip rolls 12 and 13. In addition, the apparatus suffers from a problem in that as the scanning starting position is at a certain distance from the front end of a sheet to be scanned at all times the image reading or recording cannot be performed with high efficiency.

The apparatus disclosed by U.S. patent application Ser. No. 491,003 eliminated the above-described difficulties. In that apparatus, the drum 11 can be turned in both the forward and reverse directions. When the sheet 1 is run after it is pushed against the drum 11 by the nip rolls 12 and 13 with the front end of the sheet supported by the stopper 16, the drum is rotated in the reverse direction (clockwise in FIG. 1) so that the scanning starting position is moved towards the front end of the sheet and is then stopped near the front end. Under this condition, the drum is turned in the auxiliary scanning direction (counterclockwise in FIG. 1) to start the scanning operation.

The apparatus is advantageous in that the image reading or recording can be performed with high efficiency.

However, it is disadvantageous in that, since controls must be provided for rotating the drum 11 selectively in the forward or reverse direction, the controls are rather intricate and switching the direction of rotation of the drum takes time.

SUMMARY OF THE INVENTION

Accordingly, an object of the present invention is to provide an image scanning apparatus in which the above-described difficulties accompanying a conventional image scanning apparatus have been eliminated.

The foregoing object of the invention has been achieved by the provision of an image scanning apparatus which, according to the present invention, comprises an auxiliary scanning rotary drum, a light source for emitting the main scanning light beam adapted to scan a sheet to be scanned in the axial direction of the drum which is conveyed by the drum, nip roll means arranged near the main light beam scanning position of the drum in such a manner as to be moveable into and out of engagement with the drum, sheet supplying means for feeding a sheet to be scanned into the space between the drum and nip roll means in such a manner that the sheet is in a free state; a stopper arranged downstream of the drum and nip roll means in the sheet feeding direction for receiving a sheet to be scanned which is supplied by the sheet supplying means, first control means for controlling movement of the nip roll means into and out of engagement with the drum, second control means for rotating the drum in a direction opposite to the sheet feeding direction, and sheet discharging means arranged downstream of the drum in a direction in which the sheet is moved by the drum.

The foregoing and other objects, features and advantages of he invention will be apparent from the following more particular description of a preferred embodiment of the invention, as illustrated in the accompanying drawings.

DETAILED DESCRIPTION OF THE INVENTION

One embodiment of this invention will be described with reference to the accompanying drawings.

Figure 2:
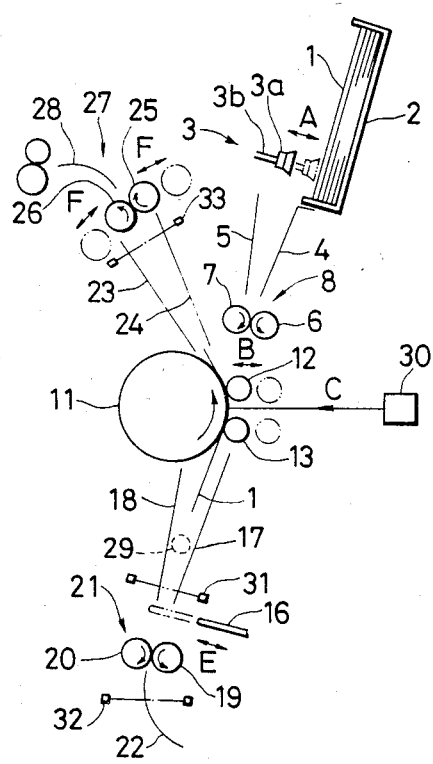
FIG. 2 is an explanatory diagram showing an image scanning apparatus according to the present invention which is employed in an image recording unit.

FIG. 2 is a schematic view of an image scanning apparatus according to the present invention which is employed in an image recording unit. The sheet to be scanned by the apparatus may be a photosensitive film or another sheet-shaped sensitive material which is exposed to a light beam.

Figure 1:
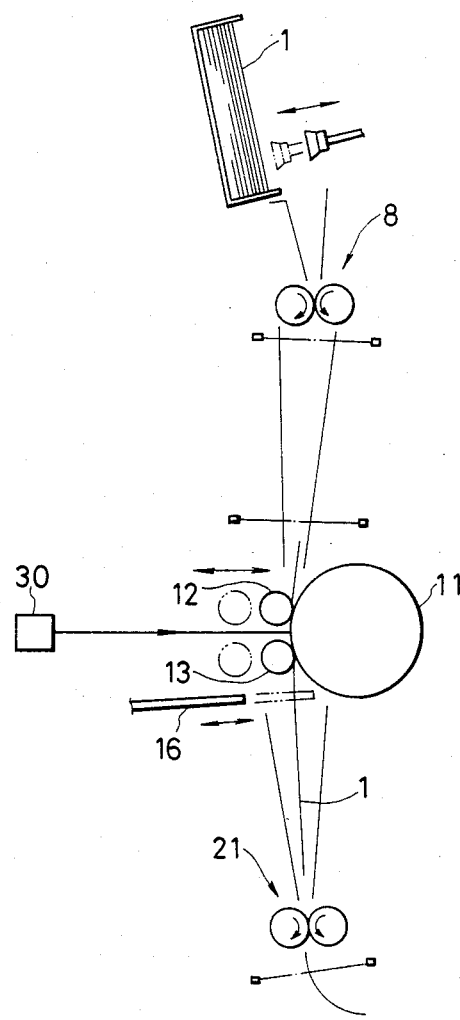
FIG. 1 is an explanatory diagram outlining an image scanning apparatus which was previously proposed by the present inventors.

In FIG. 2, those components which have been previously described with reference to FIG. 1 are therefore designated by the same reference numerals.

In the apparatus a magazine 2 is placed substantially upright, and a number of sheets 1 to be scanned are piled one on another in the magazine 2 with the photosensitive sides faced towards the bottom of the magazine. An air operated sheet sucking holder 3 comprising a sucker 3a and a pipe 3b is disposed to confront the lower portion of the opening of the magazine 3. The air operated sheet sucking holder 3 sucks air through the sucker 3a and the pipe 3b to cause the sucker 3a to retain a sheet 1 to be scanned. The sheet sucking holder 3 is a conventional one and is freely moved in the direction of the arrow A in FIG. 2. Guide boards 4 and 5 are arranged below the magazine in such a manner that they confront each other. A pair of sheet supplying rolls 8, namely, nip rolls 6 and 7, are provided below the guide boards 4 and 5 in such a manner that the nipping region of the rolls 6 and 7 confronts the lower opening which is formed by the guide boards 4 and 5. The nip rolls 6 and 7 are turned in the directions of the arrows, respectively. The drum 11 is disposed below the pair of sheet supplying rolls 8 in such a manner that onse side of the cylindrical wall of the drum 11 is in alignment with the sheet supplying rolls 8. The drum 11 is turned counterclockwise as indicated in FIG. 2. The pair of nip rolls 12 and 13 are arranged beside the drum 11 and below the lower opening of the guide boards 4 and 5 in such a manner that the nip rolls are moved in the direction of the arrow, i.e., they are moved into and out of engagement with the cylindrical wall of the drum 11. The nip rolls 12 and 13 are vertically spaced apart from each other, and the main scanning light beam C goes between the nip rolls 12 and 13 as shown in FIG. 2.

Figure 3:
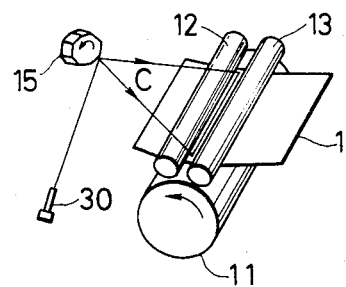
FIG. 3 is an enlarged perspective view showing the scanning portion of the apparatus in FIG. 2.
Figure 4:
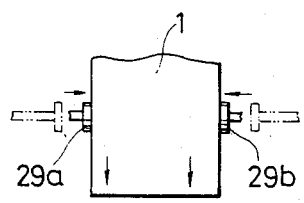
FIG. 4 is an enlarged detailed view showing the centering device.

FIG. 3 is an enlarged view of an irradiation system for applying the main scanning light beam C. As shown in FIG. 3, a light beam D such as a laser beam emitted from the main scanning light source 30 is deflected by deflecting means 15 such as a polygon mirror or galvanometer and is used as the main scanning light beam C which scans the sheet 1 in the axial direction of the drum 11 which appears between the nip rolls 12 and 13.

Provided below the nip roll 13 are two guide boards 17 and 18 which form upper and lower openings. The upper opening formed by the guide boards 17 and 18 confronts one side of the cylindrical wall of the drum 11. A stopper 16 is provided below the guide boards 17 and 18 in such a manner that it is moveable in the direction of the arrow E, i.e., it has a position where the lower opening formed by the guide boards 17 and 18 is closed by the stopper 16 and another position where the lower opening is opened. The position of the stopper 16 in the direction of the sheet passageway, i.e., the distance between the stopper and the contact region between the drum 11 and the nip rolls 12 and 13, can be adjusted according to the size of the sheet 1 to be scanned. This mechanism may be conventional wherein, for instance, the stopper 16, together with its operating means, is slidable along the sheet passageway and is click-stopped at a position which is provided for the size of the sheet to be scanned. A pair of sheet discharging rolls 21, consisting of two nip rolls 19 and 20, is disposed below the stopper 16 in such a manner that the nipping region of the rolls 19 and 20 confronts the lower opening formed by the guide boards 17 and 18. The nip rolls 19 and 20 are rotated in the direction of the arrow. A sheet discharging guide board 22 is provided below the sheet discharging rolls 21.

Two guide boards 23 and 24 are provided above the nip roll 12 in such a manner that they form the lower opening which confronts the one side of the cylindrical wall of the drum 11. A pair of sheet discharging rolls 27, consisting of nip rolls 25 and 26, is provided above the guide boards 23 and 24 in such a manner that the nipping region of the rolls 25 and 26 confronts the upper opening formed by the guide boards 23 and 24. The nip rolls 25 and 26 are so designed that they are rotated in the direction of the arrows and are movable between two positions so that the upper opening formed by the guide boards 23 and 24 is closed and opened, respectively, upon movement of the rolls in the direction of the arrows F and F. A guide board 28 is disposed above the pair of sheet discharging rolls 27. The guide boards 23, 24, and 28, and the pair sheet discharging rolls 27 form a second sheet discharging section.

Sheet detectors 31, 32, and 33, each comprising a light emitting unit and a light detecting uint, are provided near the lower end portion of the guide boards 17 and 18, below the pair of sheet discharging rolls 21 in the second sheet discharging section and below the pair of sheet discharging rolls 27 in the first sheet discharging section, respectively. A widthwise positioning device 29 is provided between the guide boards 17 and 18 to determine the position, in the main scanning direction, of the sheet 1 to be scanned which goes through the space defined by the guide boards 17 and 18. The device 29 comprises a pair of protruded pieces 29a and 29b which are moved in association with each other to change the distance therebetween in a direction peroendicular to the sheet supplying direction. The widthwise positioning device 29 is a conventional one in which the distance between the protruded pieces 29a and 29b is set relatively long before the sheet 1 passes through the protruded pieces, and while the sheet 1 passes through the protruded pieces, the latter push the sheet 1 from both sides, so as to regulate the position of the sheet in the direction perpendicular to the sheet supplying direction.

In the above-described apparatus, the drum 11 is so rotated (counteclockwise in FIG. 2) that the sheet 1 is moved in a direction opposite to the direction in which the sheet is run when supplied. When the sheet 1 is pushed against the drum 11 by the nip rolls 12 and 13 after it has been abutted against the stopper 16 at the front edge, the drum 11 is rotated in the above-described direction to start moving the sheet 1 at a constant speed, so that the sheet 1 is scanned by the main scanning light beam C.

The operation of the apparatus according to the present invention will be described.

When the recording operation of a sheet 1 to be scanned is being carried out on the drum 11 (which can be detected, for instance, from the fact that the drum 11 is rotated in the above-described direction), insertion of the next sheet 1 is not permitted until the operation has been accomplished. When the operation is accomplished so that the sheet 1 is discharged from the first or second sheet discharging section, the sheet detector 33 or 32 detects it to permit the insertion of the next sheet.

When the insertion of the next sheet has been permitted, the nip rolls 12 and 13 are set apart from the drum 11, the drum 11 is stopped, and the stopper 16 is moved to close the lower opening which is formed by the guide boards 17 and 18.

Under this condition, the sheet sucking holder 3 is moved in the right direction of the arrow A in FIG. 2. As a result, air is sucked through the pipe 3b and the top sheet 1 in the magazine 2 is sucked and retained by the sucker 3a. Then, the holder 3 is moved in the left direction of the arrow in FIG. 2 until the sheet 1 thus sucked and retained aligns with the upper opening formed by the guide boards 4 and 5, whereupon the air sucking operation is stopped. When the air sucking operation of the holder 3 is stopped, the sheet 1 is released from the sucker 3 and dropped by its own weight to the nipping region of the pair of sheet supplying rolls 8 while being guided by the guide boards 4 and 5. The sheet thus dropped is moved downwardly by the rotation of the pair of sheet supplying rolls 8 and passed between the drum 11 and the nip rolls 12 and 13 and between the guide boards 17 and 18 until it reaches the stopper 16.

Since the stopper 16 has been positioned in correspondence with the size of the sheet 1, when the sheet 1 reaches the stopper 16 its upper portion is positioned between the drum 11 and the nip rolls 12 and 13. In this connection, it should be noted that the sheet 1 is free on the stopper 16. When the sheet detector 31 detects the arrival of the sheet 1 to the stopper 16, the widthwise positioning device 29 operates to set the sheet 1 in place in the axial direction of the drum 11.

Next, the nip rolls 12 and 13 are pushed against the drum 11 while the widthwise positioning device 29 operates in such a manner that the protruded pieces are spaced apart from the sheet 1. In association with this operation, the drum 11 starts rotation, so that the sheet 1 is moved upwardly as viewed in FIG. 2 towards the first sheet discharging section while being held between the drum 11 and the nip rolls 12 and 13. With a blank margin corresponding to the time required for the rotation of the drum to become constant, the main scanning light beam C starts the recording operation.

In the recording operation, it is essential to move the sheet 1 at a constant speed with high accuracy as was described before. For this purpose, the pair of nip rolls 27 in the first sheet discharging section to which the sheet 1 is delivered are retracted from the sheet passageway as indicated by the arrows F so that they may not contact the sheet during the recording operation. The distance between the drum 11 and the pair of nip rolls 27 is such that, when a sheet 1, of the minimum size which can be handled by the apparatus, is passed through the drum 11 and the nip rolls 12 and 13, the nip rolls 25 and 26 positively hold the sheet 1 thus passed.

When the recording operation is accomplished, the drum 11 stops and the sheet 1 is discharged. In this case the apparatus of the invention may operate in two ways. The first way is effected in the case where a photosensitive film is delivered, as the sheet 1 to be scanned, directly to a dveloping unit or the like, and the above-described first sheet discharging section is utilized as one which has a height suitable for the inserting section of the developing unit or the like. In this case, after the drum 11 stops, the sheet 1 is held by the nip rolls 25 and 26 forming the pair of sheet discharging rolls 27 and simultaneously released from the nip rolls 12 and 13. The nip rolls 25 and 26 are turned in the direction of the arrows in FIG. 2 to deliver the sheet towards the inserting section of the developing unit or the like. When the sheet detector 33 detects the rear edge of the sheet 1, a signal may be provided to start processing the next sheet 1.

The second method is effected in the case where sheets 1 to be scanned are stored in temporary storing means such as a magazine and the second sheet discharging section is utilized. In this case, after the drum 11 stops, the stopper 16 is retracted from the sheet passageway, and the nip rolls 19 and 20 forming the pair of sheet discharging rolls 21 are turned in the direction of the arrows in FIG. 2, and simultaneously, the sheet 1 is released from the nip rolls 12 and 13. As a result, the sheet 1 is dropped by its own weight. Therefore, the sheet 1 is discharged between the guide boards 17 and 18 by the nip rolls 19 and 20. When the sheet detector 32 detects the rear edge of the sheet, a signal may be provided to start processing the next sheet 1.

In the above-described embodiment, after one sheet 1 has been discharged, processing the next sheet 1 is started, i.e., the next sheet is inserted into the apparatus. However, in order to increase the processing efficiency, the apparatus may be so modified that the completion of the recording operation of the present sheet 1 is predicted to start insertion of the next sheet 1 into the apparatus. For instance, the sheet detector 33 provided below the pair of sheet discharging rolls 27 in the first sheet discharging section is so positioned that it can detect sheet 1 five seconds before the recording operation of the sheet 1 is accomplished, and the output of the sheet detector 33 thus positioned is utilized to start insertion of the next sheet into the apparatus. The time of five seconds is somewhat shorter than the time interval which elapses from the time instant that insertion of the sheet 1 is started until the sheet 1 has been actually inserted into the apparatus. Thus, discharging the present sheet 1 is carried out partially in parallel with the insertion of the next sheet 1.

As is apparent from the above description, in the image recording apparatus described above, when a sheet 1 to be scanned is moved while being held between the drum 11 and the nip rolls 12 and 13, it is completely free from the pair of sheet supplying rolls 8 and the pairs of sheet discharging rolls 21 and 27. Therefore, the apparatus is free from the trouble that the drive force of the pair of sheet supplying rolls 8 interferes with the sheet 1 or the pair of sheet discharging rolls 21 or 27 contact the sheet 1 to change the speed of the sheet 1. The sheet 1 is inserted into the apparatus by being dropped by it own weight. Therefore, the apparatus is advantageous in that even if a plurality of sheets 1 are supplied by the pair of sheet supplying rolls 8, the sheets are not jammed. Positioning a sheet 1 in the axial direction of the drum is carried out by the above-described widthwise positioning device 29 in such a manner that the sheet 1 is out of contact with the pair of sheet supplying rolls 8 and is on the stopper 16. Therefore, the sheet 1 may move somewhat in a zigzag manner and the pair of sheet supplying rolls 8 may be of simple construction.

While the invention has been described with reference to its one embodiment, it should be noted that the invention is not limited thereto or thereby; that is, it will be obvious to those skilled in the art that various changes and modifications may be made without departing from the invention. For instance, although the apparatus described above uses two nip rolls for pushing a sheet 1 to be scanned against the drum 11, the number of nip rolls may be reduced to one by employing a vacuum sucking type drum instead of the drum 11. The provision of the widthwise positioning device 29 for sheets 1 to be scanned is not always necessary. However, employment of the device is advantageous in manufacturing cost, because the apparatus with the device is simpler in construction than one which has precision sheet supplying means to determine the position of a sheet in the widthwise direction.

In the above-described apparatus, the drum 11 is intermittently rotated in the direction opposite to the sheet supplying direction; however, the drum 11 may be continuously rotated. However, in this case, it is necessary that the sheet 1 is not in contact with the drum 11 for the period of time which elapses from the time instant that the sheet 1 is supplied to the apparatus until it reaches the stopper 16.

In the above-described apparatus, the stopper 16 is allowed to go in and out of the sheet passageway, and the second sheet discharging means is provided. However, it goes without saying that the apparatus may be modified in such a manner that the second sheet discharging means is eliminated and the stopper 16 is fixed. In the above-described embodiment, the image scanning apparatus is used for recording images, however, the apparatus may also be used as an image reading unit.

As is apparent from the above description, the image scanning apparatus according to the present invention comprises and auxiliar scanning rotary drum, a light source for emitting a main scanning light beam adapted to scan a sheet in the axial direction of the drum which is conveyed by the drum, nip roll means disposed near the main scanning light beam scanning position of the drum in such a manner that the nip roll means is moveable into and out of engagement with the drum, sheet supplying means for supplying a sheet to be scanned to the space between the drum and the nip roll means in such a manner that the sheet is not restricted by the drum and the nip roll means, control means for controlling the movement of the nip roll means into and out of engagement with the drum, stopper arranged downstream of the drum and nip roll means in the sheet supplying direction for receiving the sheet which is supplied by the sheet supplying means, control means for rotating the drum in the direction opposite to the sheet supplying direction, and sheet discharging means arranged downstream of the drum in the sheet delivering direction. Therefore, although the apparatus is simple in construction, it can feed the sheet at a constant speed with high accuracy. In the case when the second sheet discharging means is provided on the side which, with respect to the stopper which is moveable to go in and out of the sheet passageway, is opposite to the side where the drum and the nip roll means are provided, the sheets can be stored temporarily in the storing means such as a magazine. Therefore, even when trouble occurs in after treatment which is carried out with a developing unit or the like, it is unnecessary to suspend the image recording operation. This is another advantageous effect of the present invention.

What is claimed is:

1. An image scanning apparatus comprising an auxiliary scanning rotary drum, light source means for emitting a main scanning light beam for scanning a sheet being conveyed by said drum, nip roll means disposed near said light beam scanning position on said drum for movement into and out of engagement with said drum, sheet supplying means for feeding a sheet to be scanned into the space between said drum and said nip roll means in such a manner that said sheet is disposed without any restraint, stopper means arranged downstream of said drum and said nip roller means in the sheet feeding direction for receiving a sheet to be scanned, first control means for controlling movement of said nip roller means into and out of engagement with said drum, second control means for rotating said drum in a direction opposite to the sheet feeding direction and sheet discharging means arranged downstream of said drum relative to the direction in which said sheet is moved by said drum.

2. An apparatus as set forth in claim 1 wherein said stopper means is moveable into and out of sheet supporting position and second sheet discharging means being provided on the side opposite to the side where said drum and nip roll means are provided with respect to said stopper.

3. An apparatus as set forth in claim 1 wherein the position of said stopper is adjustable relative to said drum and nip roll means.

4. An apparatus as set forth in claim 1 further comprising centering means for positioning said sheet relative to said drum as it rests freely on said stopper means.

* * * * *